Nov. 13, 1962  A. A. VARELA  3,064,252
HEIGHT FINDING RADAR SYSTEM
Filed March 31, 1952  3 Sheets-Sheet 3
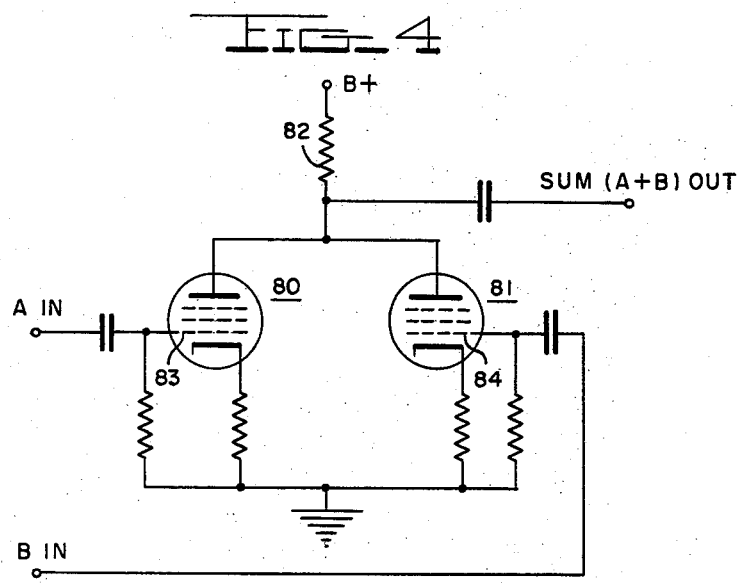
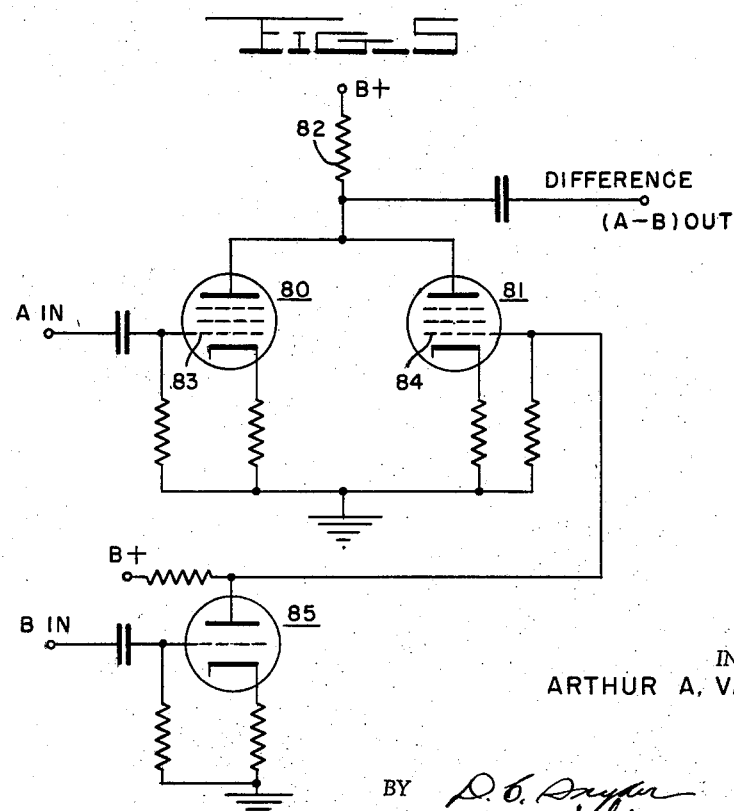
INVENTOR
ARTHUR A. VARELA Patented Nov. 13, 1962

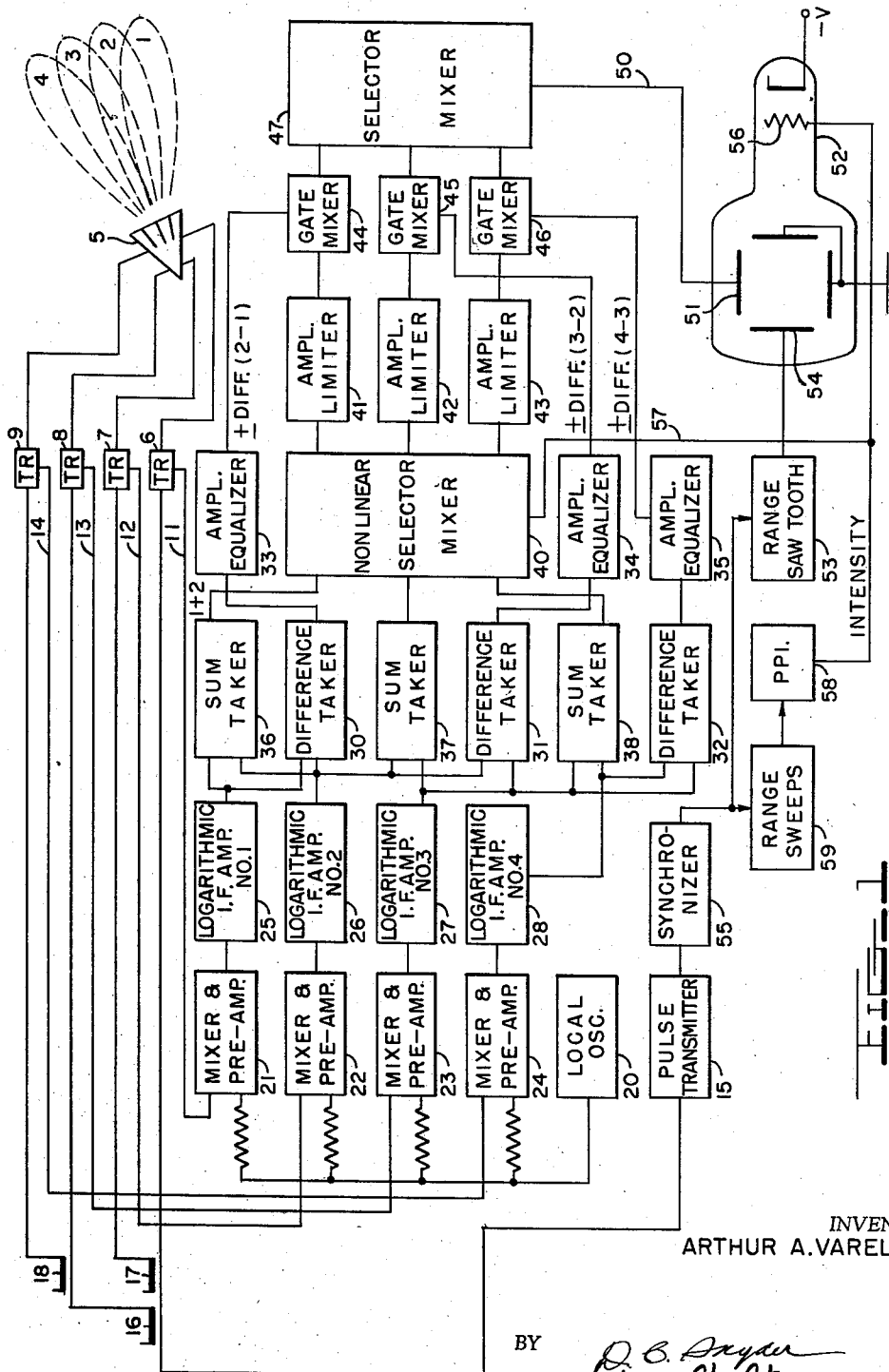

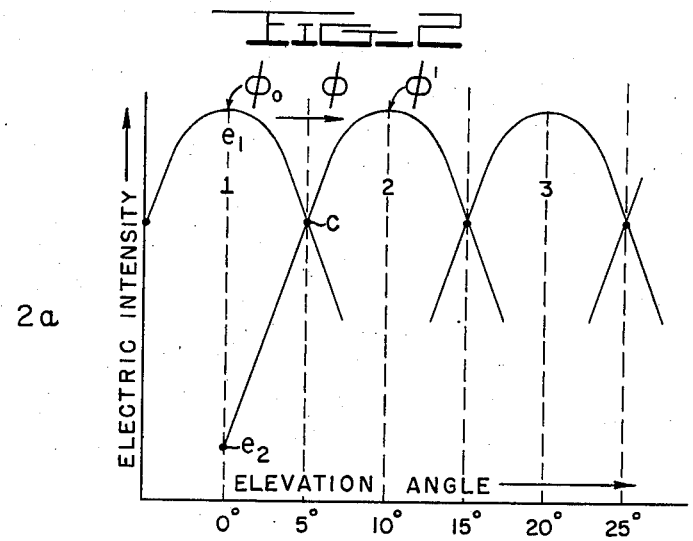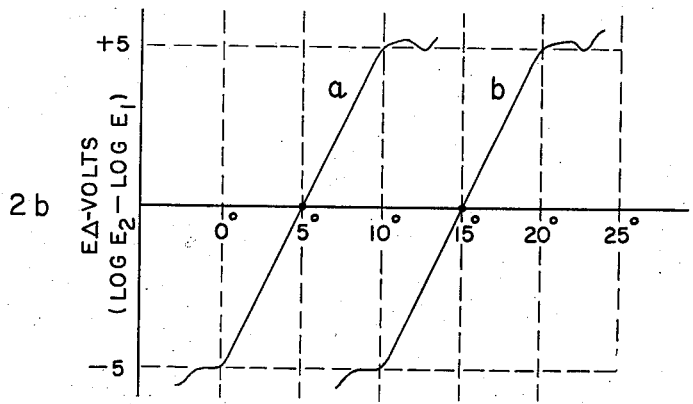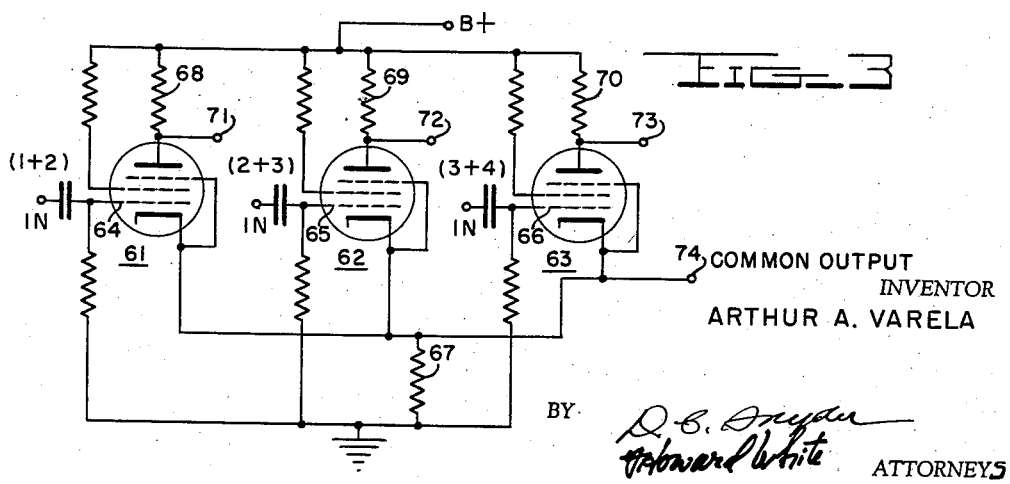

3,064,252
HEIGHT FINDING RADAR SYSTEM
Arthur A. Varela, Alexandria, Va.
Filed Mar. 31, 1952, Ser. No. 279,679
8 Claims. (Cl. 343—16)
(Granted under Title 35, U.S. Code (1952), sec. 266)

This invention relates to apparatus for locating remote targets by radio and is more specifically directed to a device of the above character wherein elevation angles of particular targets are determined together with range, or with range and azimuth.

Several methods for finding the height of remote targets have heretofore been advanced. In one such method, a radio beam that is narrow in the vertical plane is made to scan in elevation, wherein elevation angles may be determined by noting beam angles for maximum signal reception. Somewhat satisfactory results may be obtained by the scanning beam method when time is not a factor and where short range coverage only is desired. But in applications requiring the inspection of large volumes of space in short intervals of time, the above method is entirely inadequate.

Another height finding method utilizes two fan-shaped beams rotating together in azimuth. The time or azimuth lag in the received signals is a crude measure of elevation angle. Or, alternatively, two vertically stacked beams may be given distinctive characteristics, in which case, relative received signal strength while the beams are stationary can be correlated to height. Again, however, such systems inherently have undesirable limitations among which are complexity of apparatus, difficulty in data presentation, difficulty in obtaining fine measurements, and limited range and time response.

In order to overcome the above limitations, the present invention provides, in a target height finding system, apparatus which includes a transmitter for radiating a field in a selected direction, a plurality of directional receiving antennae arranged so that the beam patterns therefor will be fanned in elevation, a selector to determine which of adjacent antennae pair receives the greatest energy, a pulse pedestal generator which produces a pulse proportional to the angle of the beam crossover of the selected beam pair, and a logarithmic ratio detector, the output of which is used to modify the pedestal pulse according to the relative energy received by the selected antennae pair. From this apparatus the azimuth, range and elevation angle coordinates may be determined for the target being located.

Accordingly, it is an object of the present invention to provide an improved height finding radio locator.

Another object of the present invention is to provide an accurate automatic height finding radio locator characterized by a rapid time response.

A further object of the present invention is to provide a combined short and long range radio locator capable of inspecting large volumes of space in minimum time.

Still another object is to provide in a stacked-beam height finding radio locator, a computer capable of instantaneously reducing the signals received by the antennae array to a single range-elevation angle video signal, thus simplifying the visual presentation thereof.

A still further object is to provide in a stacked-beam height-finding radio locator a computer having an improved signal to noise ratio and weak signal response.

Other objects and advantages of the present invention will become apparent from the following description when taken in conjunction with the accompanying drawings in which:

FIGURE 1 is a block diagram of the system of the present invention.

FIGURES 2a and 2b are graphic illustrations for the purposes of explanation.

FIGURE 3 is a schematic diagram of a simplified selector circuit.

FIGURE 4 is a schematic diagram of a voltage summation circuit.

FIGURE 5 is a schematic diagram of a voltage subtraction circuit.

Referring now to FIGURE 1, there is illustrated in block diagram, a stacked-beam height-finding system embracing the principles of my invention. The system as shown provides for four beams which are fanned in elevation while being in the same direction in azimuth. It is to be understood, however, that the invention contemplates the provision of, generally, several beams which may be two or more in number. Normally, as many beams are used as are necessary to maintain a sufficient overlap on adjacent beams to avoid serious discontinuities in the coverage desired while also providing enough signal strength in adjacent beams to afford continuous height finding at reasonably long ranges.

It is also to be understood that while the beams are described to be vertically fanned for height finding, the beams may be fanned in any desired direction for the determination of the corresponding target coordinates.

In FIGURE 1, reference numeral 5 generally designates an antennae array which may suitably comprise a series of four substantially identical vertically stacked electro-magnetic horns. These horns are to be divergently aimed in order to obtain the combination of beam patterns 1, 2, 3 and 4 as shown. Any type of radiator having directive characteristics, however, may be used.

Each horn in array 5 is connected to a corresponding one of TR boxes 6, 7, 8 and 9 which perform the conventional function of decoupling the system receivers while the system transmitter is active.

Separate receiver channels are coupled by respective lines 11–14 and TR boxes 6–9 to respective horns in array 5. But either a common or separate transmitters may be employed. Where separate transmitters are practical, it is desirable to space the frequency thereof, thus preventing cross-talk and permitting a higher degree of beam over-lap. A common transmitter may be preferred as the complexity of the system is considerably reduced. Of course, separate antennae, rather than a common array, for independently receiving and transmitting may be utilized.

For simplifying the description of the embodiment of the present invention, shown in FIGURE 1, there is illustrated a common transmitter 15 which may be of any suitable type. Transmitter 15 is further shown as a pulse transmitter, the remainder of the system being correspondingly adapted for pulse-echo operation. The pulse repetition rate is selected according to conventional design considerations.

Energy from transmitter 15 is divided among the several beams by conventional directional power dividers 16, 17 and 18 to obtain the desired field distribution.

Suitable means, not shown, may be provided for rotating array 5 in azimuth. Thus, in the usual manner of pulse-echo searching, as antennae array 5 is being rotated, pulses from transmitter 15 are radiated into space. The transmitted electromagnetic wave normally will be highly directive in azimuth but should be substantially continuous in elevation. When the azimuth of the transmitter beam coincides with the relative azimuth of a target, e.g. an airplane, energy will be reflected. The horns in array 5, acting as receiving antennae, will be excited by the reflected wave according to the direction angle in elevation of the wave relative to the respective beam patterns of the horns.

A rough approximation of target height can be had with the apparatus outlined above either by a determination of which horn receives the strongest signal, the elevation angle of the associated beam axis being known, or by a determination of which pair of adjacent horns receives the greatest energy. In the latter case target height can be related to the elevation angle of a line drawn through the cross-over points on the beam patterns of the adjacent horns receiving the largest combined signal, an angle which also is known. Target range can be determined from the time delay between transmitted and received pulses in the usual manner, while target azimuth is simply the azimuth of the antennae array.

Manifestly, target height determination by the method alluded to above, is too inaccurate for most practical purposes even when there is a relatively large number of antennae in the stacked array. Much greater accuracy may be had by first determining which pair of adjacent receiving antennae receives the greatest energy and then utilizing the ratio of energy received by that pair to interpolate the target position relative to the beam axes of the pair. A computer means for accomplishing both of these functions is to be hereinafter described.

For long range operation, large variations of signal amplitudes are encountered, thus making some form of received signal compression desirable. Characteristically, a logarithmic receiver performs this function. My invention contemplates the use of such receivers for this purpose. In addition logarithmic receivers provide a convenient method of electronically obtaining ratios and further, where the ratios are taken logarithmically, the interpolation alluded above is linear as will be now described.

Turning now to FIGURE 2, in FIGURE 2a the beam patterns of a number of stacked antennae are graphically shown with elevation angle plotted as abscisca and beam intensity as ordinate. Within limits beam intensity on either side of the center of an antenna pattern may be mathematically approximated as:

$$e = K_\epsilon^{-k\phi^2}$$

where $\phi$ represents angular displacement from the beam axis. With two beams, for example, beams 1 and 2 in FIGURE 2, having a constant angular displacement $\phi'$ between beam axis, the respective intensities as a function of angle are:

$$e_1 = K_{1\epsilon}^{-K_2\phi^2} \quad (1)$$

$$e_2 = K_{1\epsilon}^{-K_2(\phi'-\phi)^2} \quad (2)$$

Defining $E_\Delta$ as being equal to the difference of the logarithm of signal intensities between adjacent patterns, then $$E_\Delta = \log_\epsilon e_1 - \log_\epsilon e_2 \quad (3)$$

which is equivalent to $$E_\Delta = \log_\epsilon \frac{e_2}{e_1}$$

By substituing Equations 1 and 2 in Equation 3:

$$E_\Delta = -K_2\phi^2 + K_2\phi'^2 - 2\phi'\phi K_2 + K_2\phi^2$$

$$= K_2\phi'^2 - 2K_2\phi\phi'$$

As $(K_2\phi'^2)$ and $(2K_2\phi')$ are constants, $E_\Delta$ may be written as:

$$E_\Delta = K - K'\phi \quad (4)$$

Equation 4 indicates that by providing a receiver which is responsive to the logarithmic ratio of signals on respective pairs of adjacent beams, linear interpolation between the beam centers may be achieved.

Thus, as shown in FIGURE 1 the antennae in array 5 are coupled by lines 11—14 to respective receiver channels, each of which may include the usual heterodyning stage, typically local oscillator 20 and preamplifiers and mixers 21 to 24, and an intermediate-frequency (IF) stage of amplifiers 25 to 28. As the individual receivers are to possess a logarithmic characteristic, IF amplifiers 25–28 may conveniently perform this function as well as signal detection. That is, the output voltage of the IF stage in the respective receiver stages is proportional logarithmically to the voltage input thereto. Logarithmic amplifiers of any suitable type may be employed, examples of which are particularly described in an article by Alred and Reiss in "Journal, Institution of Electrical Engineers," volume 95, part III, pages 459–465 and in U.S. Patent 2,244,369 issued June 3, 1941. As an alternative, linear IF amplifiers with logarithmic detectors or subsequent amplifiers may be employed if desired.

To obtain the linear interpolation of signals received on adjacent antennae, the outputs of logarithmic amplifiers for adjacent beams are substracted electronically in pairs, i.e., 2—1, 3—2, 4—3, by respective difference takers 30, 31 and 32. Exemplary of the variety of forms the subtraction circuits may take is the circuit shown in FIGURE 5, to be described more particularly hereinafter. The output difference takers 30, 31 and 32 will be in the form of Equation 4 above.

An illustration of the linear output characteristic derived in the manner described is shown in FIGURE 2b. Curve $a$, for example, represents a voltage output proportional to the output of difference taker 30, similarly curve $b$ is proportional to the output at difference taker 31. As will become apparent, the slope of these curves should be initially adjustable. For this purpose amplitude equalizers 33, 34 and 35, typically variable output amplifiers are respectively coupled to difference takers 30, 31 and 32.

An examination of the curve $a$ in FIGURE 2b will show that, in the linear segment, a negative maximum output voltage occurs at the center, or axis, of beam 1, a positive maximum at the center of beam 2, and zero output voltage at the crossover point C of beams 1 and 2. This result follows from the nature of Equation 3 above according to which the apparatus described operates, i.e.

when $$\frac{e_2}{e_1} < 1, \ \log \frac{e_2}{e_1} < 0$$

when $$\frac{e_2}{e_1} = 1, \ \log \frac{e_2}{e_1} = 0$$

and when $$\frac{e_2}{e_1} > 1, \ \log \frac{e_2}{e_1} > 0$$

Curve $b$ is, of course, similar to curve $a$ as is the output characteristic of difference taker 32 and any additional units which may be provided.

The non-linear extremities of the characteristic curves are discarded in a manner which will become apparent.

In summarizing the apparatus thus far described, one pair of receiver channels corresponding to one pair of antennae will be considered. Thus, a pulse from transmitter 15 is supplied to array 5 to be radiated into space. Assuming a target location at an angle slightly greater than the elevation angle of beam 1, a relatively large signal will be fed to mixer 21 and logarithmic amplifier 25. A relatively smaller signal will be fed to mixer 22, and amplifier 26 due to the target being quite far off center of beam 2.

By next taking the difference at circuit 30 of the logarithmic voltage outputs of amplifiers 25 and 26, an output voltage indicative of the target elevation angle is obtained. This voltage may be modified by equalizer 33 to conform to a predetermined scale.

In order to correlate the information received by each of the pairs of adjacent antennae and to obtain an output voltage scale which is continuous for increasing elevation angles, additional circuitry is provided as follows: The outputs of receivers on adjacent beams are added in pairs, i.e., 1+2, 2+3, 3+4, by respective sum takers, 36, 37, and 38. FIGURE 4, to be later described, shows the details of an addition circuit suitable for the above purpose, however, any convenient known means may be employed.

The pair sum signals are then fed to selector 40 which passes only the strongest signal from the series of sum takers 36 to 38 and blocks the output of the remainder. Selector 40 then, includes an input and a corresponding output for each of sum takers 36–38 and in addition, a common output lead 57 to be further described in conjunction with FIGURE 3.

Respectively connected to the selector outputs are limiter circuits 41, 42 and 43 which produces output voltage pulses of amplitudes independent of the input voltage level thereto. Such circuits are well known in the art, for example, regenerative amplifiers are suitable for this purpose.

As there is a corresponding limiter for each pair of adjacent beams, by setting the limited amplitudes at different levels the pair of beams receiving the strongest combined signal is identified. Since the beam angles of the identified pair are known, an approximation of the target elevation angle is obtained. This approximation coupled with the output of the corresponding difference taker serves as a basis for calculating accurate target elevation angles. Preferably, such calculations are instantaneously accomplished electronically. This may be effected by setting the limiter outputs at progressive steps, or pedestals, in order that the amplitudes thereof increase in steps according to step increases in elevation angle of the corresponding beam pairs. A convenient reference angle on the beam pairs is the crossover angle. For example, in reference to FIGURE 2b, the beam crossover angles of beam pairs 1—2, 2—3, and 3—4 respectively lie at 5°, 15° and 25°; thus, in a one-to-one scale, the pedestal voltage output of limiters 41, 42 and 43 may be set at 5, 15 and 25 volts respectively.

The difference voltages from difference takers 30, 31 and 32 are amplified by respective equalizers 33, 34 and 35 to correspond in scale with the pedestal voltage steps. By adding the corresponding difference and pedestal voltages a resultant voltage which is proportional to a target elevation angle is obtained.

FIGURE 2b illustrates the output curves of difference takers 30 and 31 when properly scaled to interpolate the respective pedestal voltages from limiters 41 and 42. As alluded to, each volt increase in the system output indicates a one degree increase in target elevation. Considering only beams 1 and 2, the pedestal voltage from limiter 41 has been set at 5 volts corresponding to the 5° angle of crossover C in FIGURE 2a. As the beam centers for beams 1 and 2 are spaced 10°, an interpolation of —5 to +5, or 10 volts, is required, over which the linear portion of curve a in FIGURE 2b is seen to extend.

Conventional gate mixer circuits 44, 45 and 46 effect the addition of the pedestal and difference voltages. These circuits are arranged to supply an output pulse only upon the application of a pedestal pulse to the appropriate input thereto in a manner well-known in the art.

It is to be understood that selector 40 will usually supply an input to only one of limiters 41 to 43 at any given instant even though there are several targets at the azimuth at which array 5 is directed. Thus only one pedestal voltage will be generated and, consequently, only the corresponding gate mixer will be unblocked. However, should two targets be at the same azimuth and range but appear on separate pairs of beam, it is possible that two of the sum takers 36 to 38 will simultaneously produce voltages equal in amplitude. This would result in two pedestal pulses being generated simultaneously. To differentiate between such pulses, a final selector 47, similar to selector 40, is connected to gate mixers 44 to 46.

The target having the greatest elevation angle, and hence, the highest pedestal pulse, is selected while information on the other target is discarded until there is a range differential. The common output from final selector 47 then gives pulse signals which, in amplitude, are a measure of the elevation angles of the targets producing them. Any utilization means, dependent upon the use to which the elevation information is put, may be coupled to selector 47. In FIGURE 1, simply for purposes of illustration, the pulse signals are applied by line 50 to the vertical deflection plates 51 of of conventional cathode ray tube 52. Range-elevation indications can be obtained from tube 52 by applying a range sawtooth from generator 53 to horizontal deflection plates 54, generator 53 being synchronized with pulses from transmitter 15 by synchronizer 55 in the usual manner. Beam intensity modulation is effected by connecting the common output of selector 40 by lines 57 to intensity grid 56 of tube 52.

If it is desired, a range-azimuth indicator may be placed in parallel with range-elevation indicator 52 to thereby provide visual indications of targets in three coordinates. In this case, plan position indicator 58 and sweep generator 59 are provided, the common output of selector 40 also being connected to the intensity grid of indicator 58 by lines 57 while synchronizer 55 and a coupling from rotatable array 5 control generator 59 to produce the necessary rotating beam sweep in the conventional manner.

A brief résumé of the operation of the system: Consider a target at an elevation angle of 3°. When the azimuth of array 5 coincides with the target azimuth, the signals received on beams 1 and 2 produce an output voltage at difference taker 30 which is proportional to the relative strength of the received signals as previously described. This voltage is amplified by equalizer 33 according to curve a, FIGURE 2b, to a value of —2 volts. Simultaneously therewith, sum taker 36 supplies to selector 40 the largest input whereby limiter 41 is caused to generate a pedestal pulse +5 volts in magnitude. At gate mixer 44, the addition of —2 volts and +5 volts in effected resulting in +3 deflection volts (indicative of the 3° target elevation angle) being applied through selector 47 to vertical deflection plates 51. The deflection of the beam of indicator 52 occurs, of course, at a range dependent upon the delay time of the received pulse.

FIGURE 3 illustrates the details of a circuit which may be used to perform the function of selector 40 in FIGURE 1. The circuit includes a series of tubes 61, 62 and 63 equal in number to the sum taker units which are respectively coupled to the tube control grids 64, 65 and 66. Preferably tubes 61 to 63 are sharp cut-off pentodes although other types may be used. A common biasing resistor 67 is connected in the cathode circuit of each tube and provides in the circuit the required mutually degenerative characteristic. Resistor 67 should be as high as the video frequency band-pass requirements permit and a minimum of several times the resistance of respective plate resistors 68, 69 and 70.

In operation a relatively strong positive pulse applied to the control grid of one of tubes 61 to 63 will cause that tube to conduct, resulting in high potential drop across resistor 67. The tube initially carrying the highest current will not be cut-off, but the potential drop across resistor 67 is reflected as a high negative bias on the control grids for the remaining tubes, sufficient to drive those tubes below cut-off. A negative pulse may be derived from the plate circuit, as at 71, 72, or 73, of the conducting tube which serves to energize the corresponding one of limiters 41, 42, or 43. In addition, a positive pulse may be obtained at common output terminal 74 which provides for the modulation of intensity grid 56 of tube 52 in FIGURE 1.

A selector circuit of the type described has the advantage as contrasted with linear mixing arrangements, of improved signal to noise response. The improvement stems mainly from the fact that the individual noise peaks rather than the sum are present in the selector output since the noise from the several receiver channels is independently random.

Selector circuit 47 may also be of the type shown in FIGURE 3 except that plates resistors 68 to 70 and output terminals 71 to 73 may be omitted as only a common output is required (line 50 in FIGURE 1).

In FIGURE 4, there is shown one of the variety of forms sum takers 36 to 38 may take. The circuit includes a pair of pentodes 80 and 81 which have a common plate resistor 82. The signals to be added are applied through the usual input parameters to respective control grids 83 and 84. In operation, the inherent characteristics of the pentodes assure that, within limits, the current flow in one of the tubes is independent of the plate voltage and thus independent of current flow through the other, and is dependent only upon control grid signal voltage. Therefore, the current flow in plate resistor 82 will cause a voltage drop thereacross proportional to the true arithmetic sum of the applied signal voltages.

The principles of operation of the sum taker circuit of FIGURE 4 may be advantageously used to provide a circuit for subtracting one voltage from another, the function performed by differences takers 30 to 32. As shown in FIGURE 5, the circuit of FIGURE 4 is modified to the extent that phase inverter stage 85 has been added.

Although inverter 85 is shown as a conventional arranged triode stage having an output in the plate circuit thereof, it is to be understood that any means of inverting the input to one of grids 83 or 84 is satisfactory. In operation consider respective positive pulses at inputs A and B. Input at A causes a linear increase in current through resistor 82 but, by virtue of inverter 85, input at B causes a linear decrease in current. The total effect is a voltage change across resistor 82 which is proportional to the voltage difference of inputs A and B.

As previously mentioned and illustrated in FIGURE 2b, the output characteristics of difference takers 30 to 32 tend to become non-linear at the extreme ends of the curves. This effect is primarily due to the basic operational approximation, or assumption, of the system becoming increasingly inaccurate with substantial angular deviations from a particular beam center, namely the equation $e = ke^{-k\phi^2}$ no longer sufficiently represents the beam patterns. Also minor lobes on the antennae patterns may become effective at angles sufficiently removed from the beam center of the particular pattern. The extremities of the difference taker output curves, therefore, are to be discarded. The discarding process, however, is simply accomplished since selector 40, operating in conjunction with the sum takers 36 to 38, inherently perform this function. For example, assuming a target between 0° and 10°, sum taker 36 has the highest output, thus selector 40 causes limiter 41 to generate a pedestal gate pulse for mixer 44. As the target moves to a position slightly above 10° in elevation, corresponding to the non-linear portion of curve a, sum taker 37, rather than sum taker 36, has the highest output; thus any output in the channel including difference taker 30, equalizer 33 and mixer 44 is blocked since limiter 41 no longer generates a pedestal gate.

It will be appreciated by those skilled in the art that the system herein described, being entirely electronic in character, is extremely rapid in operation. A time response of $0.5\mu$ second is attainable practically, whereby a pair of targets at the same azimuth and elevation angle, but separated by approximately 160 yards, can be distinguished.

While the target locator of the present invention includes as one of its principal components a logarithmic IF stage, the inclusion thereof in the system is not absolutely essential. The logarithmic concept affords a method for deriving linear ratios useful for providing linear interpolation, but it will be appreciated by those skilled in the art that other interpolation means, linear or non-linear, may be substituted.

Also, the receiving section of the present invention has been described in conjunction with a transmitter radiating energy to be reflected from targets. As far as elevation indications are concerned, it is readily apparent that the receiving apparatus, per se, does not distinguish between energy reflected or originating at the target.

Although the embodiments disclosed in the drawings and preceding description are preferred, many modifications may be made without deviating from the scope of the broadest aspects of the present invention.

The invention described herein may be manufactured and used by or for the Government of the United States of America for governmental purposes without the payment of any royalties thereon or therefor.

What is claimed is:

1. In a receiver for a target location system, a plurality of directional receiving antennae adapted to receive energy from remote targets, said antennae producing vertically stacked beams having an overlap on adjacent beam patterns, logarithmic amplifying means coupled to each of said receiving antennae, voltage summation means coupled to each pair of amplifying means associated with adjacent antennae, differential derivation means coupled to each of said pairs of amplifying means, a selector circuit having respective input terminals connecting said circuit to said summation means and having respective output terminals, said circuit being responsive to the summation means having the greatest output to produce a gating pulse at the corresponding circuit output terminal, normally blocked respective gating means coupled to said output terminals and to said differential means for unblocking the output of the differential means corresponding to the selected summation means, said unblocked output being an indication of the elevation angle of the target being located.

2. In a receiver for receiving energy reflected from a remote target, a plurality of pairs of receiving antennae, each having overlapping beam patterns with a preselected crossover angle in elevation, means for selecting the pair of said plurality of pairs of receiving antennae receiving the greatest instantaneous energy, and means connected to said last mentioned means for providing a signal representative of the crossover angle of the selected pair of receiving antennae.

3. In a receiver for receiving energy reflected from a remote target, a plurality of pairs of receiving antennae, each having overlapping beam patterns with a preselected crossover angle in elevation, means for selecting the pair of receiving antennae receiving the greatest instantaneous energy, signal generating means connected to the selected pair of receiving antennae for providing a first signal representative of the crossover angle of the selected pair of antennae, signal ratio means connected to said selected pair of receiving antennae for providing a second signal in dependency on the ratio of energy received by one to the energy received by the other of the selected pair of receiving antennae, means connected to the output of said signal generating means and said signal ratio means for combining the first signal and the second signal, an indicating device, and means for connecting the output of said last mentioned means to said indicating device.

4. In a receiver for receiving energy reflected from a remote target, a plurality of pairs of receiving antennae, each having overlapping beam patterns with a preselected crossover angle in elevation, means for selecting the pair of receiving antennae receiving the greatest instantaneous energy, signal generating means connected to the selected pair of receiving antennae for providing a first signal representative of the crossover angle of the selected pair of antennae, first means connected to said selected pair of receiving antennae for providing a second signal representative of the angular direction of received energy relative to the crossover angle of said selected pair of receiving antennae, second means connected to the output of said signal generating means and said first means for combining the first signal and the second signal, an indicating device, and means for connecting the output of said second means to the indicating device.

5. In a receiver for receiving energy reflected from a remote target, a plurality of pairs of receiving antennae, each having overlapping beam patterns with a preselected crossover angle in elevation, means for selecting the pair of receiving antennae receiving the greatest instantaneous energy, signal generating means connected to the selected pair of receiving antennae for providing a first signal representative of the crossover angle of the selected pair of antennae, means connected to each of said selected pair of receiving antennae for providing a second signal and a third signal in dependency on the logarithm of energy received by the first and second of said pair of receiving antennae, respectively, differing means connected to said last mentioned means for providing a fourth signal in dependency on the difference in magnitude between said second signal and said third signal, mixing means connected to the output of said signal generating means and said differencing means for combining said first signal and said fourth signal, an indicating device, and means for connecting the output of said mixing means to said indicating device.

6. In a receiver for receiving energy reflected from a remote target, a plurality of pairs of receiving antennae, each having overlapping beam patterns with a preselected crossover angle in elevation, a plurality of summing means, each connected to the output of a respective pair of said plurality of pairs of receiving antennae, a plurality of signal generators, each corresponding to a respective one of said plurality of summing means and each providing a first signal representative of the crossover angle of a respective pair of said plurality of receiving antennae, selector means connected to said plurality of summing means for selecting a desired one of said plurality of summing means and for connecting the selected summing means to the corresponding one of said plurality of signal generators, a plurality of signal ratio means, each connected to a respective pair of said plurality of receiving antennae for providing a second signal in dependency on the ratio of energy received by one to the energy received by the other of the pair of said plurality of receiving antennae connected thereto, a plurality of mixer circuits, means connected to said plurality of mixer circuits, said plurality of signal generators and said plurality of signal ratio means for applying the first signal provided by each of said signal generators and the second signal provided by each of said plurality of signal ratio means to a respective one of said plurality of mixer circuits, an indicating device, and means for connecting the indicating device to the output of said plurality of mixer circuits.

7. In a receiver for receiving energy reflected from a remote target, a plurality of pairs of receiving antennae, each having overlapping beam patterns with a preselected crossover angle in elevation, a plurality of summing means, each connected to the output of a respective pair of said plurality of pairs of receiving antennae, a plurality of signal generators, each corresponding to a respective one of said plurality of summing means and each providing a first signal representative of the crossover angle of a respective pair of said plurality of receiving antennae, selector means connected to said plurality of summing means for selecting a desired one of said plurality of summing means and for connecting the selected summing means to the corresponding one of said plurality of signal generators, a plurality of means, each connected to a respective pair of said plurality of receiving antennae for providing a second signal representative of the angular direction of received energy relative to the crossover angle of the pair of said plurality of receiving antennae connected thereto, a plurality of mixer circuits, means connected to said plurality of mixer circuits, said plurality of signal generators and said plurality of means for applying the first signal provided by each of said signal generators and the second signal provided by each of said plurality of means to a respective one of said plurality of mixer circuits, an indicating device, and means for connecting the indicating device to the output of said plurality of mixer circuits.

8. In a receiver for receiving energy reflected from a remote target, a plurality of pairs of receiving antennae, each having overlapping beam patterns with a preselected crossover angle in elevation, a plurality of pairs of logarithmic amplifiers, each connected to a respective pair of the plurality of pairs of receiving antennae and each providing a first signal and a second signal, a plurality of sum takers, each connected to the output of a respective pair of said plurality of pairs of logarithmic amplifiers, a plurality of signal generators, each corresponding to a respective one of said plurality of sum takers and each providing a third signal representative of the crossover angle of a respective pair of said plurality of pairs of receiving antennae, first selector means connected to said plurality of sum takers for selecting a desired one of said plurality of sum takers and for connecting the selected sum taker to the corresponding signal generator, a plurality of differencing means, each connected to a respective pair of said plurality of pairs of logarithmic amplifiers for providing a fourth signal in dependency on the difference in magnitude of the first signal and the second signal of the pair of said plurality of pairs of logarithmic amplifiers connected thereto, a plurality of coincidence circuits, means connected to said plurality of signal generators, said plurality of differencing means and said plurality of coincidence circuits for applying the third signal provided by each of said plurality of sum takers and the fourth signal provided by each of said plurality of differencing means to a respective one of said plurality of coincidence circuits, second selector means connected to said plurality of coincidence circuits for selecting a desired one of said plurality of coincidence circuits upon the simultaneous application of a first signal and a second signal to more than one of said plurality of coincidence circuits, an indicating device, and means for connecting said indicating device to the output of said plurality of coincidence circuits.

References Cited in the file of this patent

UNITED STATES PATENTS

| | | |
|---|---|---|
| 2,426,183 | Deloraine | Aug. 26, 1947 |
| 2,524,180 | Schuck | Oct. 30, 1950 |
| 2,548,913 | Schreiner | Apr. 17, 1951 |
| 2,688,132 | Wolff | Aug. 31, 1954 |

FOREIGN PATENTS

| | | |
|---|---|---|
| 581,728 | Great Britain | Oct. 23, 1946 |